(12) United States Patent
Misawa et al.

(10) Patent No.: US 7,830,590 B2
(45) Date of Patent: Nov. 9, 2010

(54) MAGNETIC MIGRATION AND REVERSAL DISPLAY PANEL AND MAGNETIC MIGRATION AND REVERSAL DISPLAY METHOD

(75) Inventors: Hideki Misawa, Yokohama (JP);
Ryuusuke Sakuma, Hiratsuka (JP);
Shinichi Murakata, Hiratsuka (JP);
Shunsuke Kajiwara, Hiratsuka (JP);
Takeo Yokoyama, Yokohama (JP);
Morio Sato, Fujisawa (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 1252 days.

(21) Appl. No.: 10/573,188

(22) PCT Filed: Mar. 31, 2004

(86) PCT No.: PCT/JP2004/004625
§ 371 (c)(1),
(2), (4) Date: Mar. 22, 2006

(87) PCT Pub. No.: WO2005/052139
PCT Pub. Date: Jun. 9, 2005

(65) Prior Publication Data
US 2008/0105550 A1 May 8, 2008

(30) Foreign Application Priority Data
Oct. 6, 2003 (JP) ............................... 2003-346871
Oct. 31, 2003 (JP) ............................... 2003-373778

(51) Int. Cl.
*G02B 26/00* (2006.01)

(52) U.S. Cl. ..................................................... 359/296

(58) Field of Classification Search .................. 359/298, 359/296
See application file for complete search history.

(56) References Cited

U.S. PATENT DOCUMENTS 4,368,952 A * 1/1983 Murata et al. ............... 359/296
4,643,684 A     2/1987 Murata et al.
6,017,667 A * 1/2000 Hakata .................. 430/111.35

(Continued)

FOREIGN PATENT DOCUMENTS

CN        1327917        12/2001

(Continued)

*Primary Examiner*—Ricky L Mack
*Assistant Examiner*—Vipin M Patel
(74) *Attorney, Agent, or Firm*—Flynn, Thiel, Boutell & Tanis, P.C.

(57) ABSTRACT

In a magnetic display panel that changes the display using a magnet, a polychrome display panel is obtained that magnetically displays two colors in addition to the background, thus, specifically, magnetically displays three colors. The magnetic migration and reversal display panel encloses a dispersion liquid obtained by dispersing micro-magnets with differently colored magnetic poles in a dispersion medium containing a colorant. After writing representing two display colors is obtained by selecting a specified magnetic pole, causing from the front surface side the migration or migration/reversal of the micro-magnets in the dispersion liquid, and displaying the color tone of the specified surface of the micro-magnets, the color tone of writing is changed without changing the state of writing by causing the magnetic field of the opposite magnetic pole to act from the same surface side on the micro-magnets configuring the writing where the color tone is displayed.

10 Claims, 4 Drawing Sheets

U.S. PATENT DOCUMENTS 6,686,940 B2 * 2/2004 Matsuura et al. ............ 347/112

FOREIGN PATENT DOCUMENTS

| CN | 1328316 | 12/2001 |
| --- | --- | --- |
| JP | 51-146924 | 6/1975 |
| JP | 55-164815 | 12/1980 |
| JP | 59-32796 | 8/1984 |
| JP | 60-107689 | 6/1985 |
| JP | 62-53359 | 11/1987 |
| JP | 2002-082363 | 3/2002 |
| JP | 2002-82363 | 3/2002 |
| WO | WO 01/48548 | 7/2001 |

* cited by examiner

MAGNETIC MIGRATION AND REVERSAL DISPLAY PANEL AND MAGNETIC MIGRATION AND REVERSAL DISPLAY METHOD

TECHNICAL FIELD

The present invention relates to a magnetic migration and reversal display panel and a magnetic migration and reversal display method, and more particularly relates to a magnetic migration and reversal display panel and a magnetic migration and reversal display method wherein a display is formed using a magnet to cause the migration or migration/reversal of micro-magnets, and the display is erased by attracting the micro-magnets from the back surface using a magnet for erasing. The present invention further relates to a magnetic migration and reversal display panel and magnetic migration and reversal display method wherein display colors of micro-magnets that have formed a display using a magnet are changed by re-reversing from the same surface micro-magnets that have formed a display using a magnet of the other magnetic pole, and the display is erased by attracting the micro-magnets using a magnet for erasing from the back surface.

BACKGROUND ART

Magnetic display systems using magnetic display panels that can provide a display using magnetism have been well known in the past, and the magnetic migration display panel that displays by the migration of magnetic particles as cited in Japanese Patent Publication No. 62-53359B and the magnetic reversal display panel that displays by reversing magnetic particles as cited in Japanese Patent Publication No. 59-32796B have been proposed as related magnetic display systems.

As indicated in FIG. 6, the aforementioned magnetic migration display panel, called the migration type, is a display method that obtains a magnetic display by: attracting magnetic particles (13) in a magnetic panel to a back surface plate (11) side of a magnetic migration display panel by sliding a magnet (4) for erasing over the full surface of the back surface plate (11) side prior to writing so that a front surface plate (10) side is made a uniform surface; and scanning the magnet (5) for writing on a front surface plate (10) side so as to partially attract the magnetic particles (13) to the surface plate (10) side. When erasing this kind of magnetic display, the magnet (4) for erasing is slid over the back surface plate (11) side of the magnetic migration display, the magnetic particles (13) on the front surface plate (10) side are attracted to the back surface plate (11) side, and the magnetic display written on the front surface plate (10) side of the magnetic migration display sheet is erased. Nonetheless, because erasing is done from the back surface plate (11) side in this kind of display and erasing method, it was difficult to erase only the desired part of the magnetic display written on the magnetic migration display panel, and was thus inconvenient and limited in use. Moreover, only a monochrome magnetic display could be obtained because monochrome (black) roughly spherically shaped particles that are representative of magnetite particles were used.

Meanwhile, as indicated in FIG. 7, the aforementioned magnetic reversal display panel, called the reversal type, is a display means in which a magnetic display is obtained by: using a magnet for erasing having a specified magnetic pole from the front surface plate (10) side of the magnetic reversal display panel prior to writing to make the same pole of micro-magnets (2) in the magnetic panel face the front surface plate (10) side of the panel so that the surface of the front surface plate (10) side is made uniform; and partially reversing the micro-magnets on the same front surface plate (10) side using a magnet (5) for writing having the opposite magnetic pole and causing the color of the opposite magnetic pole of the micro-magnet (2) to be displayed based on the magnetic pole that the magnet (5) for writing has used. When erasing this kind of magnetic display, the erasing is done from the same front surface plate (10) side, and therefore, the range of use can be broadened because it is possible to erase only the desired part, and this kind of magnetic display can be used for applications, etc. where sliding of a magnet over the back surface plate (11) side is not allowed. However, the magnetic display written on the magnetic reversal display panel is governed by the two color tones of the micro-magnets (2) which are divided into the two colors on the front and back. Moreover, it is necessary to use a transparent liquid as the dispersion medium in order to faithfully realize the color tones of the front and back of the micro-magnets (2). Specifically, the magnetic display can only obtain a two-color display, i.e., the color tone of the uniform state prior to writing and the color tone given by the magnet for writing, which are the color tones of the front and back of the micro-magnets (2).

DISCLOSURE OF THE INVENTION

Thus, an object of the present invention is to provide a magnetic migration and reversal display panel and a magnetic migration and reversal display method thereof that can display two colors in addition to the background, specifically, can magnetically display three colors by using a magnet to form a display by causing micro-magnets to migrate or to migrate/reverse, changing the display colors by using a magnet from the same side to re-reverse the micro-magnets, and erasing the display by then using a magnet for erasing from the back surface to attract the micro-magnets.

The present invention resolves the aforementioned problems by the following inventions.

Specifically, the present invention relates to:

1. A magnetic migration and reversal display panel comprising at least a dispersion liquid having a yield value obtained by dispersing, in a dispersion medium comprising a colorant, micro-magnets having magnetic poles that differ in color and that differ in color from the dispersion medium as well, and support members that retain the dispersion liquid, wherein the micro-magnets comprise two or more kinds of magnetic materials with different coercive forces.

2. The magnetic migration and reversal display panel according to 1, wherein the micro-magnets comprise at least two or more kinds of magnetic material including a first magnetic material comprising a high coercive force material and a second magnetic material comprising a low magnetic coercive force material.

3. The magnetic migration and reversal display panel according to 1 or 2 above, wherein for the two kinds of magnetic material within the micro-magnets, the coercive force of the first magnetic material is 65.0 kA/m or more and 600 kA/m or less, and the coercive force of the second magnetic material is less than 65.0 kA/m.

4. The magnetic migration and reversal display panel according to any of 1 to 3 above, wherein the coercive force of the first magnetic material is two or more times the coercive force of the second magnetic material.

5. The magnetic migration and reversal display panel according to any of 1 to 4 above, wherein the first magnetic material is hexagonal magnetoplumbite-type ferrite, and the second magnetic material is at least one magnetic materials selected from the group consisting of magnetite, maghemite, cobalt-deposited magnetite, and cobalt-deposited maghemite.

6. The magnetic migration and reversal display panel according to any of 1 to 5 above, wherein the coercive force of the micro-magnets is 4.0 kA/m or more and 600 kA/m or less.

7. The magnetic migration and reversal display panel according to any of 1 to 6 above, wherein the residual magnetization per unit mass of the micro-magnets is 1 to 35 $A \cdot m^2/kg$, and the saturation magnetization per unit mass of the micro-magnets is 1 to 100 $A \cdot m^2/kg$.

8. The magnetic migration and reversal display panel according to any of 1 to 7 above, wherein the yield value of the dispersion liquid is 0.15 to 7.5 $N/m^2$.

9. The magnetic migration and reversal display panel according to any of 1 to 8 above, wherein a colorant contained in the dispersion liquid has a desired color tone.

10. The magnetic migration and reversal display panel according to any of 1 to 9 above, wherein a fluorescent coloring agent is contained in the dispersion medium and/or micro-magnets.

11. The magnetic migration and reversal display panel according to any of 1 to 10 above, wherein an antistatic agent is contained in the dispersion liquid.

12. A magnetic migration and reversal display panel comprising at least a dispersion liquid having a yield value obtained by dispersing, in a dispersion medium comprising a colorant, micro-magnets with magnetic poles that differ in color and that differ in color from the dispersion medium as well, and support members that retain the dispersion liquid, wherein writing selectively representing one of two display colors can be obtained by selection of the magnetic poles of an external magnetic field, wherein a specified pole of the external magnetic field is selected at a region where writing is to be formed and the external magnetic field is applied to act on the region from the front surface side for causing migration or migration and reversal of the micro-magnets in the dispersion liquid and thereby displaying the color tone of a specified surface, which is a surface of the magnetic pole of the micro-magnets opposite to the selected magnetic pole of the external magnetic field.

13. A magnetic migration and reversal display method, wherein the magnetic migration and reversal display panel according to any of 1 to 12 above is used, the method comprising:

forming writing by causing an external magnet for writing to act on the micro-magnets for causing migration and/or reversal of the micro-magnets, and thereby causing the color tone of the specified surface of the micro-magnets to be displayed; and then changing the color tone of the writing by reversing the micro-magnets forming the writing by causing a magnetic field of the magnetic pole opposite to the magnetic pole of the external magnet for writing to act from the same surface side within a range that other micro-magnets that do not form the writing are not caused to migrate.

BEST MODE FOR CARRYING OUT THE INVENTION

Figure 4:
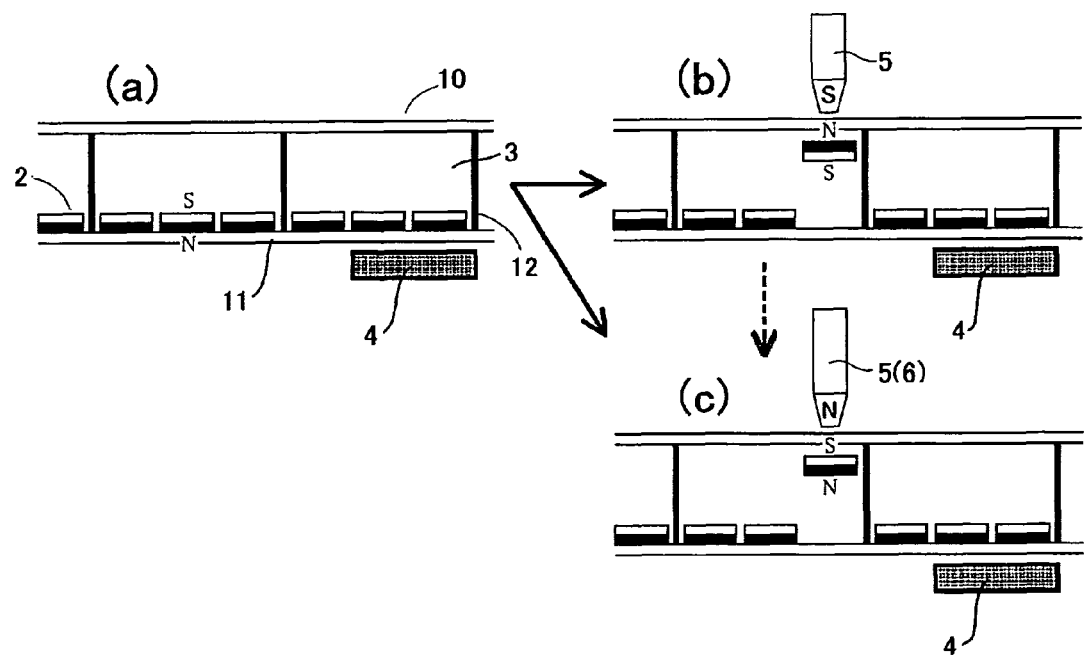
FIGS. 4(a), (b) and (c) are pattern diagrams indicating the display mechanism of a magnetic migration and reversal display panel of the present invention.

The magnetic migration and reversal display panel of the present invention comprises at least a dispersion liquid (3) having a yield value obtained by dispersing, in a dispersion medium comprising a colorant, micro-magnets with differing color magnetic poles, and support members that retain the aforementioned dispersion liquid therein. A three color magnetic display is obtained by this kind of configuration. Specifically, as indicated by FIG. 4, if the micro-magnets (2) are attracted to the back surface plate (11) side using the magnet (4) for erasing, the components of the dispersion liquid (3) excluding the micro-magnets (2) are colored and the aforementioned micro-magnets (2) are concealed, and therefore when viewed from the front surface plate (10) side, the first color is obtained as the uniform display of the color tone of the dispersion medium (FIG. 4(a)). The second color tone is obtained by making micro-magnets (2) in the aforementioned dispersion liquid (3) migrate or migrate/reverse by selecting the specified magnetic pole of the magnet (5) for writing and using the action of the external magnetic field on the region where writing is to be performed, and thereby displaying the color tone of the specified surface (for example, the N pole surface) of the aforementioned micro-magnets (2) (FIG. 4(b)). Further, after the writing is obtained based on the aforementioned magnetic display, the third color tone is obtained by causing an optional portion of the micro-magnets (2) forming the writing to reverse by causing the magnetic field of the opposite magnetic polarity based on the reversal magnet (6) to act on the aforementioned writing in which the color tone of the specified surface is displayed in a range that does not cause the other micro-magnets (2) that have not formed writing to migrate, and the color tone of the optional portion of the writing is changed without changing the format of the writing (FIG. 4(c)). It goes without saying that this writing color can be displayed in reverse if the magnetic poles of the external magnetic fields when obtaining the second and third color tones are reversed.

Figure 5:
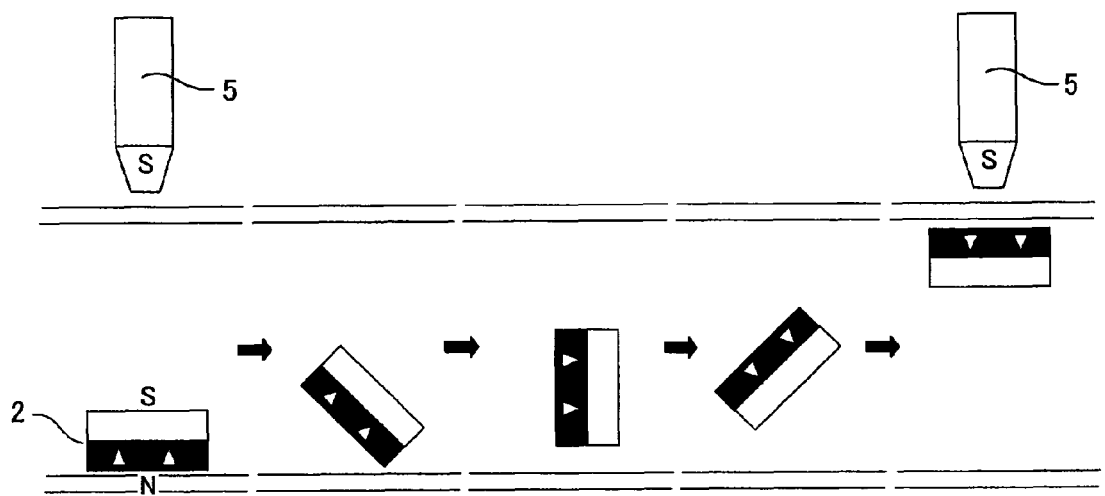
FIG. 5 is a pattern diagram indicating the micro-magnet behavior mechanism of a magnetic migration and reversal display panel of the present invention.
Figure 6:
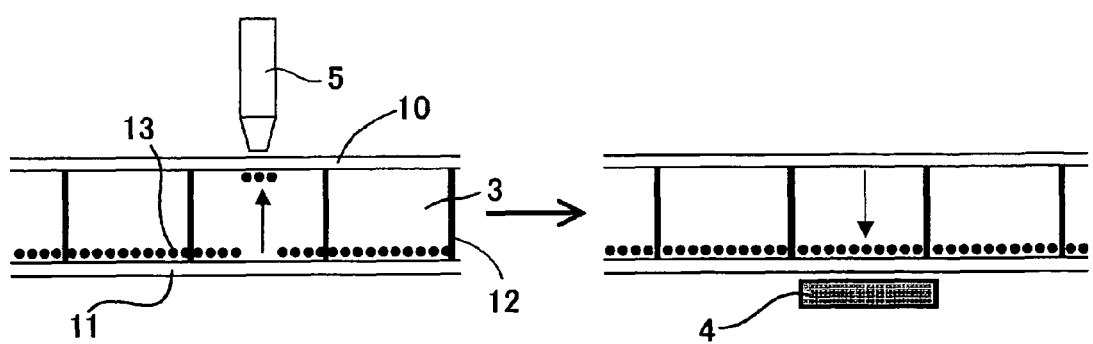
FIG. 6 is a pattern diagram indicating the display mechanism of a conventional magnetic migration type display panel.
Figure 7:
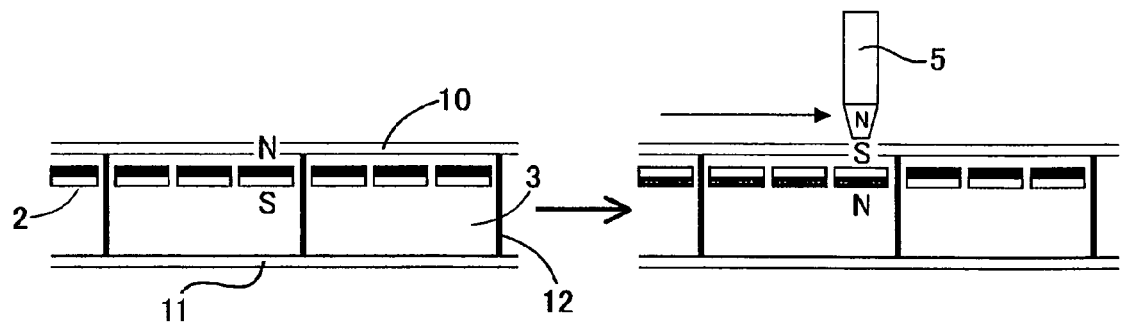
FIG. 7 is a pattern diagram indicating the display mechanism of a conventional magnetic reversal type display panel.

When making the polychrome display above, the polychrome display based on migration and reversal can be controlled by skillfully controlling the external magnetic fields used when causing migration or migration/reversal, that is, by controlling the magnetic characteristics of the magnet (5) for writing, etc. and the reversal magnet (6) used in display color reversal. Specifically, in order for the micro-magnets (2) to migrate, the micro-magnets (2) must be attracted against the resistance in the liquid just the amount of the height of the cells of the panel support member in which the dispersion liquid is sealed by the partition plate (12) in FIG. 4 cited as an example of the magnetic migration and reversal display panel of the present invention. In particular, if going against gravitation, then just that amount of resistance is added. Consequently, a comparatively strong external magnet is selected when writing. The color of the magnetic display at this time is determined by whether the selected magnetic pole is the N pole or the S pole. This is because the micro-magnets (2) have different front and back magnetic poles of differing colors. Regarding the action of the micro-magnets (2) at the time of this display, the micro-magnets (2) migrate as is and manifest display color on the surface when related to the magnet (5) for writing by differing poles facing the panel display surface; and the micro-magnets (2) migrate while reversing and manifest the display of the opposite color tone when the same poles are facing (FIGS. 4 and 5).

Moreover, in the present invention, the color tone of an optional portion of the writing can be changed without changing the shape of the writing by reversing an optional portion of the micro-magnets (2) forming the writing by applying the action of a magnetic field of the opposite magnetic polarity based on reversal magnet (6) to the writing displayed in that it causes the display of the aforementioned color tones of the specified surface. At this time, in order to reverse and change the color of only the micro-magnets (2) of the optional portion of the writing that has been displayed, it is necessary to exercise control such that only the micro-magnets (2) of the optional portion of the writing displayed are reversed in the range that the other micro-magnets (2) that have not formed writing are not made to migrate by the magnetic field received. Specifically, this is achieved by control such that when receiving the action of a comparatively weak magnetic field, the only writing reversed is that is displayed in the range that the other micro-magnets (2) do not migrate, that is, only the micro-magnets (2) that have migrated to the display surface side are reversed.

Consequently, when used in this way to obtain optional writing by selecting optional color tones, it is possible to obtain a polychrome display in which the color tone of only an optional portion of the writing obtained is changed.

As long as the magnetic force to attract the micro-magnets (2) from the display surface side to the back surface side can be provided, any magnet (4) for erasing may be used in the panel of the present invention, and the magnetic polarity is not particularly limited. This is because, when viewed from the display side, the micro-magnets (2) attracted to the back surface side are hidden by the components of the dispersion liquid other than the micro-magnets (2), and which surface is facing the display surface side poses no particular problem.

In brief, the magnetic materials that configure magnets, etc. are generally classified into hard magnetic materials, semi-hard magnetic materials and soft magnetic materials depending on the strength of the coercive force thereof. The coercive force of magnetic materials is described to have a broad range from 0.001 kA/m to 1000 kA/m. Among these, soft magnetic materials indicate substances having an extremely small coercive force of 0.01 kA/m or less, and are used in hard disk magnetic recording heads and the magnetic cores of power devices such as transformers. Meanwhile, hard magnetic materials indicate substances having large coercive force with a large projection in the magnetic hysteresis curve, and are used as so-called permanent magnets. Substances between the hard and the soft magnetic materials, called semi-hard magnetic materials, have an intermediate coercive force value often in the vicinity of 10 to 100 kA/m, and are used in magnetic recording materials such as disks for hard disk recording and magnetic tape.

Permanent magnets are generally used as the magnets that provide the external magnetic field in magnetic display panels, and among the magnetic materials above, the so-called hard magnetic materials having large coercive force are used. Regarding the surface magnetic flux density, substances having a magnetic force of about 40 to 350 mT are used; in the migration type magnetic panels, materials having about 40 to 70 mT are used as the magnet for erasing and materials having a magnetic force of about 100 to 350 mT are used as the writing magnet. Moreover, in the reversal type magnetic panels, materials having about 60 to 90 mT are used as the magnet for erasing and materials having a magnetic force of about 80 to 110 mT are used as the writing magnet. Here, it is clear that a relatively weak magnet is used in an reversal type magnetic panel compared to the magnet used in a migration type magnetic panel. This is because the elements that implement the display are tiny magnets and it is necessary to make the selection in a range that does not break down the magnetic poles of the micro-magnets. Further, the reason that the surface magnetic flux density of the magnet for erasing is lower than that of the magnet for writing is because a comparatively strong material with concentrated magnetic fluxes is selected when writing since it is necessary for the magnet for writing to reliably provide a magnetic field to the magnetic particles or micro-magnets by the action of a one time magnetic field. In contrast, erasing everything at one time is not necessarily a priority for a desirable magnet for erasing, and a comparatively weak magnet for erasing may be used in order to allow the magnetic field for erasing to act in a comparatively wide range and in order to further protect the micro-magnets. Specifically, from the perspective of protecting the micro-magnets, it is important in the design of the magnetic characteristics of the micro-magnets to focus on the magnetic characteristics of the surface magnetic flux density, etc. of the magnet for writing and not of the magnet for erasing.

Here, the surface magnetic flux densities based on the aforementioned magnetic materials respectively correspond to the coercive force of the following magnetic materials. Specifically, this may also be called the endurance strength of the micro-magnets. The aforementioned surface magnetic flux density is generally equivalent to a coercive force of about 32 to 278 kA/m; in a migration type magnetic panel, the magnet for erasing is about 32 to 56 kA/m and the magnet for writing is about 80 to 278 kA/m; and in a reversal type magnetic panel, the magnet for erasing is about 48 to 72 kA/m and the magnet for writing is about 64 to 87 kA/m. Consequently, when using the migration and reversal type magnetic panel of the present invention, the elements that implement the display are micro-magnets, which is the same as in a conventional reversal type magnetic panel, and therefore comparatively weak magnets of about 80 to 110 mT are selected as the magnet used for writing because it is necessary to make the selection in a range that does not breakdown the magnetic poles of the micro-magnets.

Meanwhile, the colors of micro-magnets used in the present invention are divided by making the two magnetic poles, the N pole and the S pole respectively, different colors. As described above, displays are formed by making these micro-magnets migrate and reverse by the action of an external magnetic field. For example, if the micro-magnets are collected on the back surface side and the display surface is the color tone of the colored dispersion medium, etc., when the S pole of the magnet for writing slides across the display surface of the panel, the micro-magnets migrating from the back surface side to the front surface side, the N pole surface comes to the panel front surface, displaying the color of the N pole surface. When sweeping this surface with the N pole of another magnet with a weak magnetic force, only the micro-magnets that had migrated to the front surface side are reversed, the S pole surface of the micro-magnets appear, and the display color can be changed while keeping the shape of the display unchanged. Next, if a comparatively strong magnet for erasing is run across from the back surface side, the micro-magnets migrate to the back surface side and the display is erased.

Specifically, in the present invention, it is possible to alternatively select from two colors for writing through the selection of the magnetic pole of the magnet for writing, and the written portion with the color selected from these two colors can be reversed to the other color by selecting the magnetic pole of the magnet for reversing.

The present invention was made based on the finding that two colors can be selectively used for written as described above, and that a portion of the writing in the color selected from these two colors can be reversed to the other color, and this is achieved by combining micro-magnets having end surfaces of two colors corresponding to the respective polarities, an external magnet for writing and an external magnet for erasing that are comparatively strong, and an external magnet for reversing with a weak magnetic force.

Further, while it is necessary to have a comparatively strong external magnet in order to conduct satisfactory writing, namely, migration display, to conduct satisfactory reversal, it is preferable to satisfy the opposite condition of selecting a comparatively weak magnet as described above in order that no micro-magnets other than those of the part to be reversed migrate and in order that the magnetic poles of the micro-magnets are not broken down. However, when conducting both actions of migration and reversal in the same panel as in the present invention, there is the risk of breaking down the magnetic poles of the micro-magnets if priority is given to conducting satisfactory migration display and selecting strong external magnets, and in this case, a satisfactory reversal display appears to be difficult. On the other side, if priority is given to maintaining reversal display performance and a weak external magnet is selected, then the disadvantage appears that the applied magnetic force is weak when conducting migration display and erasing, and migration itself becomes difficult. Although a satisfactory reversal display is possible if the micro-magnets are arranged on the front side as in a conventional reversal type magnetic panel, there is the disadvantage that the magnetic force provided is weak when conducting migration display and erasing, and the physical properties of the dispersion liquid must be closely controlled. As a result, problems arise with process control, with restrictions placed on the use environment, with causing migration itself. Specifically, difficulties with migration/reversal display arise depending on the selection of the external magnetic field, posing the problem that satisfactory rewriting cannot be achieved. Thus, the magnetic migration and reversal display panel of the present invention resolves the problems by using micro-magnets under specified conditions that should be able to broaden the range for selecting the external magnet, and to conduct satisfactory migration/reversal display by comparatively free selection of external magnets.

Being able to control the migration and reversal positions of the micro-magnets as previously described is important. Specifically, materials with easily controllable magnetic properties are preferable. In the past, it was sufficient to consider only the reversal performance of the micro-magnets used in the reversal type magnetic display panel, and therefore, the materials used were from a single group of magnetic materials or were materials with extremely similar magnetic properties with the only difference being the degree of manufacturing tolerance based on processing precision, and a satisfactory balance was not provided between the magnetic characteristics for contributing to migration and the magnetic characteristics for contributing to reversal.

Thus, the micro-magnets used in the inventions comprise magnetic materials with two or more differing kinds of coercive force. It is thereby possible to broaden the range of magnetic characteristics such as the apparent coercive force of the micro-magnets, etc., and to obtain micro-magnets that fulfill both roles of contributing to migration characteristics and contributing to reversal characteristics.

Moreover, the micro-magnets comprise two or more kinds of magnetic materials including at least a first magnetic material comprising a high coercive force material and a second magnetic material comprising a low coercive force material. The present invention can have a clearly broader range of the previously described magnetic characteristics and can obtain satisfactory migration and reversal characteristics by making a composite of materials with differing magnetic characteristics, namely, of high coercive force materials and low coercive force materials as described above.

Here, high coercive force materials indicate magnetic materials having a comparatively high coercive force and mainly comprise hard magnetic materials and also include some semi-hard magnetic materials, and these are magnetic materials that are difficult to magnetize using an external magnetic field. When forming a reversal display of micro-magnets, the high coercive force materials contribute to manifesting good reversal performance. For example, hexagonal crystal magnetoplumbite-type ferrites such as barium ferrite, strontium ferrite, etc.; rare earth cobalts such as samarium cobalt, cerium cobalt, yttrium cobalt, praseodymium cobalt, etc.; neodymium alloy, samarium-iron-nitrogen alloy, and neodymium group nano-crystal spring magnetic particles, etc. may be cited.

Meanwhile, low coercive force materials indicate materials with a slightly smaller coercive force, that is, materials with an intermediate coercive force or less among those of soft magnetic materials and semi-hard magnetic materials, and these are magnetic materials that are comparatively easy to be influenced by an external magnetic field. When forming a migration display of the micro-magnets, the low coercive force materials contribute to manifesting good migration performance. For example, magnetite, maghemite, cobalt-deposited magnetite, and cobalt-deposited maghemite, manganese zinc ferrite, nickel zinc ferrite, lead ferrite, rare earth ferrite, and chrome dioxide may be cited.

In the present invention, the micro-magnets can have a clearly broader range of the magnetic characteristics of the micro-magnets and can obtain superior migration and reversal characteristics by making a composite of materials with differing magnetic characteristics.

Although the display performance, such as the migration and reversal characteristics when allowing the action of the external magnetic field, are often satisfied when using only high coercive force materials, the micro-magnets are affected by their magnetic force and the magnetic field from an external magnet such as a writing pen, and aggregate in a pile rather than lining up in parallel on the panel front surface side. As a result, the problems arise that parallel arrays covering the panel front surface cannot be achieved and that gaps are produced where there are no micro-magnets in relation to the display surface, and thus it is difficult to obtain full display and contrast. There is the extremely important problem that once the micro-magnets aggregate, it is difficult to break the aggregates up. Moreover, raising the abundance ratio of the micro-magnets by increasing the mixing ratio of the micro-magnets tends to produce unsatisfactory reversal of the parts doubled up based on mutual interference, and thus there are limits to control by the micro-magnet compounding ratio. Moreover, a general problem when using only high coercive force materials is a tendency for the residual magnetization to increase based on the properties of those materials. Regarding reversal performance, there is a tendency for micro-magnet position control to become hypersensitive wherein the mutual magnetic force when applying the action of the external magnetic field becomes more than is necessary, and reverses micro-magnets of parts where no action is desired. Although there are countermeasures such as raising the yield value and viscosity of the dispersion liquid in order to avoid this, there is the disadvantage of worsened micro-magnet response arising from the deleterious effects of gradual increases in yield value and viscosity based on changes over time and of a broadening of the range of physical property changes dependent on the ambient temperature. Further, when making the external magnetic field stronger in order to avoid this, another problem arises in that writing and re-reversal displays of only the desired part become more difficult, posing the risk of engendering cumulative problems.

Further, it is also possible to use mixed multiple types of magnetic materials, specifically, high coercive force materials and low coercive force materials, as a granulated magnetic material. Such examples include the magnetic materials obtained by mixing multiple types of extremely fine magnetic materials such as nanomagnetic particles and then agglomerating them with a binder, etc.

If using only low coercive force materials, there is the risk that, depending on the circumstances, the surface magnetic flux density of the external magnet selected may exceed the coercive force of the micro-magnets and break down the magnetic poles of the micro-magnets, giving rise to a fatal problem in the reversal properties.

Thus, in the present invention, materials with differing magnetic characteristics are compounded for the micro-magnets, but an even better effect is achieved if the high coercive force materials have a coercive force two or more times that of the low coercive force material. Further, other materials that can potentially be used as magnetic materials may be suitably compounded as long as there is little risk of a bad influence on the performance of the migration and reversal characteristics and no problems are caused. These kinds of magnetic material include magnetic metal oxides such as black magnetite, colcothar-colored or reddish maghemite, green chrome oxide, yellow lithium ferrite, etc.; and they may be compounded for the purpose of coloring the micro-magnets.

As previously described, the two kinds of magnetic materials in the micro-magnets are more effective if the coercive force of the first magnetic material is 65.0 kA/m (817 Oe) or more and 600 kA/m (7560 Oe) or less, preferably, 65.0 kA/m (817 Oe) or more and 350 kA/m (4402 Oe) or less; and the coercive force of the second magnetic material is less than 65.0 kA/m (817 Oe).

If the first magnetic material has a coercive force of less than this range, the reversal characteristics of the micro-magnets are inadequate as described above when using the low coercive force material alone; the magnetic pole surfaces of the micro-magnets do not make uniform parallel arrays on the panel display surface side, and there is a tendency for the display to be ill-defined or impossible to make.

If the coercive force of the first magnetic material is large, the micro-magnets become magnetically stable and at the same time there is a general tendency for the residual magnetization to become large, improving the reversal performance thereof and making the effects in relation to reversal characteristics easier to obtain with smaller amounts. Nonetheless, if exceeding the aforementioned range, there is a restriction that the compounding design becomes delicate. Specifically, because the magnetic characteristics tend to depend on slight disturbances in the mixing balance, if the mixing amount is more than the designed mixing amount, the surface magnetic flux densities of the micro-magnets themselves tend to become large, leading to aggregation of the micro-magnets; and if too little is mixed, challenging aspects for manufacturing and design appear because the same kind of problems with reversal characteristics are prone to occur as when the coercive force of the first magnetic materials is less than the above range.

Moreover, if the second magnetic material has a coercive force exceeding the above range, the surface magnetic flux density of the micro-magnets themselves becomes too large as when using high coercive force materials alone, aggregation of the micro-magnets tends to occur, and if the mixing amount of the magnetic material is reduced in order to satisfy the reversal performance, the migration characteristics tend to become insufficient as a result.

Consequently, if either the first magnetic material or the second magnetic material departs from the aforementioned ranges, difficulties in harmonizing both the migration performance and the reversal performance of the micro-magnets are prone to occur.

Here, the boundary between the coercive forces of the first magnetic material and the second magnetic material was set at 65.0 kA/m (817 Oe) because the threshold point at which the best behavioral balance is obtained between the reversal characteristics and the migration characteristics for display performance is experimentally obtained, and in some cases, a high magnetic force magnet with a surface magnetic flux density of about 110 mT is selected for writing as an external magnetic field, that is, as the magnet for writing, generally used in reversal type magnetic panels as described above. A magnetic material with a surface magnetic flux density of about 110 mT is equivalent to a magnetic material with a coercive force of 87 kA/m. However, because the magnetic force decreases in inverse proportion to the distance, 65.0 kA/m (817 Oe) may be cited as a satisfactory threshold point depending on the effects of the surface panel, dispersion liquid, surface coating on the micro-magnets, and binder components, etc. A semi-hard magnetic material of 0.5 kA/m (6.3 Oe) or more and less than 65.0 kA/m (817 Oe) is preferable as the second magnetic material. A soft magnetic material is theoretically a material of about 0.001 kA/m or less including 0 kA/m (0 Oe), and can be used as the magnetic material exhibiting effective magnetic characteristics in the present invention. Nevertheless, there is the problem that semi-hard magnetic materials and soft magnetic materials that have a very low coercive force are generally difficult to process as fine particles. Because the micro-magnets are configured from composite materials as described above, it is preferable to make the magnetic materials into fine particles, and apply a coating, etc. to the particles. However, in terms of properties, it is difficult to process these materials as fine particles and, therefore, the magnetic materials have a comparatively large size. This carries the risk of problems with reversal and migration characteristics.

Naturally, when the magnetic materials constituting the micro-magnets are those as described above, good results can be obtained. In addition, when the obtained micro-magnets themselves have a coercive force of 4.0 kA/m (50.3 Oe) or more and 600 kA/m (7560 Oe) or less, preferably 4.0 kA/m (50.3 Oe) or more and 310 kA/m (3900 Oe) or less, and more preferably 12.0 kA/m (150.9 Oe) or more and 80 kA/m (1006 Oe) or less, further desirable results can be obtained.

When falling short of the above range, the reversal characteristics of the micro-magnets tend to be inadequate in the same way as when using low coercive force materials alone as described above; the magnetic pole surfaces of the micro-magnets do not make uniform parallel arrays on the panel display surface side, and there is a tendency for the display to be ill-defined or impossible to make. If strong magnets are used when selecting the external magnets, the magnetic poles of the micro-magnets are prone to break down.

If, on the other hand, the above range is exceeded, the surface magnetic flux density of the micro-magnets themselves becomes too large and, as a result, aggregation of micro-magnets occurs. Further, the micro-magnets are hypersensitive to the effects of the external magnetic field, further aggregation occurs, thereby causing the problems described above.

Moreover, micro-magnets preferably comprise the following magnetic characteristics a) and b) per unit mass.

a) Residual magnetization: 1 to 35 $A \cdot m^2/kg$ (1 to 35 emu/g)
b) Saturation magnetization: 1 to 100 $A \cdot m^2/kg$ (1 to 100 emu/g)

Residual magnetization contributes greatly to reversal characteristics of the micro-magnets and is necessary in order for the micro-magnets to change directions as rapidly as possible in relation to the external magnetic field. If falling short of the above range, the micro-magnets tend not to reverse and, if exceeding the range, the micro-magnets tend to aggregate.

Saturation magnetization contributes mainly to the micro-magnet migration characteristics and is for producing magnetic sensitivity by which the micro-magnets are steadily magnetically attracted by the external magnetic field. If falling short of the above range, the micro-magnets tend not to reverse and, if exceeding the range, the micro-magnets tend to aggregate.

More preferably, the magnetic characteristics are as below.

a') Residual magnetization: 3 to 16 $A \cdot m^2/kg$ (3 to 16 emu/g)
b') Saturation magnetization: 5 to 40 $A \cdot m^2/kg$ (5 to 40 emu/g)

As long as the S pole and the N pole surfaces of the micro-magnets used in the present invention are tinged with different colors, the shape is not particularly limited. However, taking into account the display formation characteristics when writing with the so-called magnetic pen and the sharpness of the display formed, the micro-magnets having differently colored poles are preferably those prepared by cutting or pulverizing a laminate material in which one side of a layer composed of a magnetic material dispersed in a synthetic resin and/or synthetic rubber composition of a specified color is coated with a colored composition of another color. Or, preferable examples are: micro-magnets prepared by forming a magnetic material dispersion layer on a colored metal vapor-deposited layer and cutting the resultant laminated material; and micro-magnets prepared by cutting or pulverizing a layered magnetic material, in which one side of a layer composed of magnetic particles dispersed in a synthetic resin and/or synthetic rubber composition of a specified color is laminated with a colored sheet of another color.

The dispersion liquid in which the micro-magnets are dispersed preferably contains a colorant, is colored, and has a specified yield value. The reason for being colored is in order to erase the display when the micro-magnets migrate to the back surface side as described above, that is, in order to hide the color of the micro-magnets that have separated from the front surface side and have migrated to the back surface side, and to reliably conduct migration display and erasing. Further, at this time, it is also possible to hide the color of the micro-magnets by complete concealment, and the display color of the micro-magnets can also be substantially erased by using a color tone of a complementary color. Various types of pigments and dyes, etc. can be suitably selected as the colorant. The yield value is for the micro-magnets to be properly dispersed in the dispersion liquid, and is necessary to prevent sedimentation. Specifically, the dispersion liquid preferably has a yield value of about 0.15 to 7.5 $N/m^2$ and, more preferably, has a yield value of 0.3 to 5.0 $N/m^2$. Conventional methods may be suitably used to obtain these physical values and the dispersion liquid may be obtained by suitably mixing a dispersion medium, a thickener, a colorant and an antistatic agent, etc. When making the magnetic field act on the display panel, the viscosity must allow migration or reversal of only a desired portion and a dispersion liquid with a viscosity of about 3 to 350 mPa·s is preferable.

Support members that retain the aforementioned dispersion liquid are not particularly limited and support members that make a seal around two substrates arranged to provide a gap, support members that have roughly hexagonal honey comb cells arranged between two substrates and support members that have capsules arranged on the substrates, etc. may be suitably used.

Examples of magnetic migration and reversal display panels that embody the present invention will be described, and the present invention will be more specifically explained using diagrams.

EXAMPLES

Example 1

A blue magnetic sheet was obtained by using the following procedures to coat and dry a magnetic ink, which was prepared by dispersing and dissolving each composition listed in Table 1 in methyl ethyl ketone (called "MEK" hereinafter), on a polyethylene terephthalate (called "PET" hereinafter) film with a thickness of 25.0 μm. The thickness of the blue magnetic ink layer at this time was 25.5 μm, and the coated mass was 51.3 $g/m^2$.

Procedure 1

The resin composition was dissolved in MEK in the mixing ratio in Table 1, and two kinds of magnetic material having different magnetic characteristics were added and then dispersed using an attritor mill for one hour.

Procedure 2

The pigment dispersion substance, which was prepared by dispersing blue pigment in MEK, was added to the dispersion liquid in the mixing ratio in Table 1 and was mixed and stirred. Thus, a magnetic ink presenting a blue color was obtained. (Solid parts 60 mass %)

Procedure 3

The magnetic ink was coated using a wire bar and dried, and the blue magnetic sheet described above was obtained.

Next, a white ink of the composition below was coated and dried on the blue magnetic layer of the sheet following the procedure described above and a white ink layer was laminated on the blue magnetic layer.

The thickness of this white ink layer was 8.0 μm, and the coating mass was 16.0 $g/m^2$.

White pigment dispersion element: 60.0 mass parts (titanium oxide pigment MEK dispersion element: solid parts 66.0%)

Resin: 31.8 mass parts (epoxy resin MEK solution: solid parts 60.0%)

Solvent: 8.2 mass parts (MEK)

Next, a pink ink of the composition below was coated and dried on the white ink layer of the sheet following the procedure described above, and a pink ink layer was laminated on the white layer.

The thickness of the pink ink layer was 8.0 μm, and the coating mass was 9.6 g/m².

Pink pigment dispersion element: 75.0 mass parts (pink pigment MEK dispersion element: solid parts 30.0%)

Resin: 25.0 mass parts (epoxy resin MEK solvent solution: solid parts 60.0%)

The 3 layers obtained by coating in this way formed a coated sheet with a combined thickness of 41.5 μm and a coating mass of 76.9 g/m².

Subsequently, after this coated layer was magnetized on the base film to make the blue face the N pole and the pink face the S pole, the coated layer was peeled from the base film in the form of a thin leaf and, after being finely pulverized using a cutter mill pulverizer, was sifted to obtain micro-magnets coated with blue/pink colored magnetic poles and having a particle size of 63 to 180 μm. Here, the magnetic characteristics of the micro-magnets are indicated in Table 1.

Method of Measuring Magnetic Characteristics

Measurements of the coercive force, residual magnetization and saturation magnetization of the micro-magnets in the present invention were conducted by a vibration sample magnetometer (Model VSM-P7-15 manufactured by Toei Kogyo Co., Ltd.), and the method was as follows. Specifically, the micro-magnets were tightly packed in a measurement case comprising the following lid (A) and main body (B), and when applying a magnetometer magnetic field of 684.4 kA/m to this measurement case, the hysteresis curve was recorded on an X-Y recorder. The coercive force, residual magnetization and saturation magnetization were derived from this hysteresis curve. For the residual magnetization and the saturation magnetization, the residual magnetization and the saturation magnetization per unit mass (A·m²/kg) were determined by dividing the above values obtained from the hysteresis curve by the mass of the micro-magnets packed in the measurement case.

(A) Acrylic resin lid comprising a disk with a thickness of 1 mm and a diameter of 7.0 mm, and a projection with a height of 0.5 mm and a diameter of 6 mm projecting from one side of the surface of this disk (B) Acrylic resin cylindrical case main body with a bottom, which had an internal diameter of 6.0 mm, an external shape of 7.0 mm with a hole 2.5 mm in depth, and a height of 4.0 mm Meanwhile, a thickener paste was prepared, in which a thickener was added to an isoparaffin having a viscosity of 3.2 mPa·S at 20° C. as a dispersion medium, heated, dissolved and then cooled. Next, the thickener paste, a colorant and an antistatic agent were added to the isoparaffin and agitated, and a plastic dispersion solution with the following mixing ratio was obtained.

Thickener: 1.3 mass parts (ethylene bis-12-hydroxystearate amide (trade name: ITOHWAX J-530 manufactured by Ito Oil Chemicals Co., Ltd.)

Colorant: 1.4 mass parts (titanium oxide)

Antistatic agent: 0.1 mass parts

Dispersion medium: Remainder (trade name: ISOPAR M manufactured by Esso Chemical Co., Ltd.)

Next, the aforementioned flake-shaped micro-magnets tinged with the two colors of blue/pink were mixed with the plastic dispersion solution at a proportion of 10.7 mass parts of micro-magnets to 89.3 mass parts of dispersion solution; the resultant mixture was stirred, and a plastic dispersion liquid having each yield values listed in Table 1 was obtained with micro-magnets uniformly dispersed in the dispersion liquid.

To measure the yield value, a Brookfield type viscosity meter (Model BL manufactured by Tokyo Keiki Co., Ltd.) was used in the conventional manner, and the measurements were taken by reading the angle of torsion of the rotor when rotating the rotor in the dispersion liquid at a low speed (0.3 rpm). The No. 2 rotor included with the aforementioned model BL viscosity meter was used.

Subsequently, this dispersion liquid was filled into the cells of a honey comb multi-cell structure of vinyl chloride resin which had cells, each having a regular hexagonal shape having a cell size of 3.5 mm and a height of 1.0 mm, and was affixed to one side of a vinyl chloride resin film 0.25 mm thick using an adhesive. Afterwards, the open surface of the multi-cell structure was covered with a 0.08 mm thick vinyl chloride resin film using an adhesive. Thus, a display panel with the dispersion liquid sealed in the cells was obtained.

Examples 3, 11 to 12, 15, 24 (Blue/Pink Color)

Micro-magnets were produced in the same manner as in Example 1 except that the components in the first magnetic layer described in Tables 1 to 4 were used. Moreover, after making each dispersion liquid in the same manner as in Example 1 except for suitably mixing the thickener as in Tables 1 to 4, panels were prepared and evaluated.

Examples 2, 4 to 10, 13 to 14, 16 to 23, 25 to 33; Comparative Examples 1 to 8 (Gold/Black)

Micro-magnets were produced in the same way as in Example 1 except that taking the first magnetic layers described in Table 1, a 3.0 μm combination of a yellow-colored layer and an aluminum vapor deposition layer were provided on a 25.0 μm thick PET film treated with a releasing agent, wherein the first magnetic layer was coated on the aluminum vapor deposition layer and the white ink and pink ink layers were not applied. Moreover, after preparing the dispersion liquid in the same manner as in Example 1, except for suitably mixing the thickener as in Tables 1 to 5, panels were prepared and evaluated.

TABLE 1

|  |  |  |  | Example |  |  |  |  |  |  |  |  |  |
|---|---|---|---|---|---|---|---|---|---|---|---|---|---|
|  |  |  |  | 1 | 2 | 3 | 4 | 5 | 6 | 7 | 8 | 9 | 10 |
| First layer (magnetic layer) | Mixing ratio (wt %) | High coercive force material | BaO•6Fe$_2$O$_3$ (Hc 145.6 kA/m) |  |  |  |  |  | 25.0 | 25.0 |  | 2.5 |  |  |
|  |  |  | BaO•6Fe$_2$O$_3$ (Hc 175.1 kA/m) |  |  |  |  |  |  |  |  |  |  |
|  |  |  | SrO•6Fe$_2$O$_3$ (Hc 318.3 kA/m) | 8.8 | 5.0 | 9.0 |  |  | 2.5 |  | 25.0 | 8.0 | 8.0 |
|  |  | Low coercive | Ni$_x$Zn$_{1-x}$Fe$_2$O$_4$ (0 < x ≦ 1) (Hc 0.8 kA/m) |  |  |  |  |  |  |  |  |  |  |

TABLE 1-continued

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
|  | force material | $Fe_3O_4$ (Hc 3.3 kA/m) |  |  |  |  |  |  | 47.5 |  |  |  |
|  |  | $Fe_3O_4$ (Hc 5.9 kA/m) |  |  |  |  |  | 22.5 |  |  |  |  |
|  |  | $Fe_3O_4$ (Hc 11.4 kA/m) | 31.2 | 45.0 | 21.0 |  |  |  |  |  | 42.0 | 42.0 |
|  |  | Co-γ-$Fe_2O_3$ (Hc 51.7 kA/m) |  |  |  | 25.0 | 25.0 |  |  | 25.0 |  |  |
|  |  | Co—$Fe_3O_4$ (Hc 56.6 kA/m) |  |  |  |  |  |  |  |  |  |  |
|  | Binder | Epoxy resin | 40.0 | 50.0 | 42.0 | 50.0 | 50.0 | 75.0 | 50.0 | 50.0 | 50.0 | 50.0 |
|  | Colorant | Blue pigment | 5.0 | 0.0 | 8.4 | 0.0 | 0.0 | 0.0 | 0.0 | 0.0 | 0.0 | 0.0 |
|  |  | White pigment | 15.0 | 0.0 | 19.6 | 0.0 | 0.0 | 0.0 | 0.0 | 0.0 | 0.0 | 0.0 |
|  |  | Total | 100.0 | 100.0 | 100.0 | 100.0 | 100.0 | 100.0 | 100.0 | 100.0 | 100.0 | 100.0 |
| Magnetic characteristics | Coercive force of high coercive force material [kA/m] | | 318.3 | 318.3 | 318.3 | 145.6 | 145.6 | 318.3 | 145.6 | 318.3 | 318.3 | 318.3 |
|  | Coercive force of low coercive force material [kA/m] | | 11.4 | 11.4 | 11.4 | 51.7 | 51.7 | 5.9 | 3.3 | 51.7 | 11.4 | 11.4 |
|  | Coercive force of micro-magnets [kA/m] | | 18.2 | 15.0 | 21.3 | 76.7 | 76.7 | 11.1 | 4.3 | 86.4 | 16.4 | 16.4 |
|  | Residual magnetization of micro-magnets [A·$m^2$/kg] | | 4.5 | 6.9 | 11.2 | 15.5 | 15.5 | 1.9 | 2.1 | 16.1 | 5.3 | 5.3 |
|  | Saturation magnetization of micro-magnets [A·$m^2$/kg] | | 21.3 | 35.8 | 12.0 | 30.6 | 30.6 | 17.1 | 20.3 | 30.4 | 27.8 | 27.8 |
|  | Thickener mixing ratio [wt %] | | 1.3 | 1.3 | 1.3 | 1.3 | 4.1 | 1.3 | 1.3 | 1.3 | 1.3 | 2.3 |
|  | Dispersion liquid yield value [N/$m^2$] | | 0.3 | 0.3 | 0.3 | 0.3 | 4.5 | 0.3 | 0.3 | 0.3 | 0.3 | 1.0 |
| Panel evaluation | Migration characteristics | | ⊗ | ⊗ | ⊗ | ⊗ | ⊗ | ○ | ○ | ○ | ⊗ | ⊗ |
|  | Reversal characteristics (aggregation characteristics) | | ⊗ | ⊗ | ⊗ | ⊗ | ⊗ | ○ | ○ | ○ | ⊗ | ⊗ |
|  | Print quality | | ⊗ | ⊗ | ⊗ | ⊗ | ⊗ | Δ | Δ | ○ | ⊗ | ⊗ |
|  | Overall evaluation | | ⊗ | ⊗ | ⊗ | ⊗ | ⊗ | ○ | Δ | ○ | ⊗ | ⊗ |

TABLE 2

|  |  |  |  | Example | | | | | | | | | |
|---|---|---|---|---|---|---|---|---|---|---|---|---|---|
|  |  |  |  | 11 | 12 | 13 | 14 | 15 | 16 | 17 | 18 | 19 | 20 |
| First layer (magnetic layer) | Mixing ratio (wt %) | High coercive force material | BaO•6$Fe_2O_3$ (Hc 145.6 kA/m) |  |  | 5.0 | 5.0 |  |  |  |  |  |  |
|  |  |  | BaO•6$Fe_2O_3$ (Hc 175.1 kA/m) |  |  |  |  |  |  |  |  |  |  |
|  |  |  | SrO•6$Fe_2O_3$ (Hc 318.3 kA/m) | 15.0 | 15.0 |  |  | 23.0 | 5.0 | 5.0 | 45.0 | 45.0 | 5.0 |
|  |  | Low coercive force material | $Ni_xZn_{1-x}Fe_2O_4$ (0 < x ≤ 1) (Hc 0.8 kA/m) |  |  |  |  |  |  |  |  |  |  |
|  |  |  | $Fe_3O_4$ (Hc 3.3 kA/m) |  | 15.0 |  |  |  |  |  |  |  |  |
|  |  |  | $Fe_3O_4$ (Hc 5.9 kA/m) |  |  |  |  |  |  |  |  |  |  |
|  |  |  | $Fe_3O_4$ (Hc 11.4 kA/m) | 15.0 |  |  |  | 7.0 | 5.0 | 5.0 | 5.0 | 5.0 |  |
|  |  |  | Co-γ-$Fe_2O_3$ (Hc 51.7 kA/m) |  |  | 45.0 | 45.0 |  |  |  |  |  | 45.0 |
|  |  |  | Co—$Fe_3O_4$ (Hc 56.6 kA/m) |  |  |  |  |  |  |  |  |  |  |
|  | Binder | Epoxy resin | | 42.0 | 42.0 | 50.0 | 50.0 | 42.0 | 90.0 | 90.0 | 50.0 | 50.0 | 50.0 |
|  | Colorant | Blue pigment | | 8.4 | 8.4 | 0.0 | 0.0 | 8.4 | 0.0 | 0.0 | 0.0 | 0.0 | 0.0 |
|  |  | White pigment | | 19.6 | 19.6 | 0.0 | 0.0 | 19.6 | 0.0 | 0.0 | 0.0 | 0.0 | 0.0 |
|  |  | Total | | 100.0 | 100.0 | 100.0 | 100.0 | 100.0 | 100.0 | 100.0 | 100.0 | 100.0 | 100.0 |
| Magnetic characteristics | Coercive force of high coercive force material [kA/m] | | | 318.3 | 318.3 | 145.6 | 145.6 | 318.3 | 318.3 | 318.3 | 318.3 | 318.3 | 318.3 |
|  | Coercive force of low coercive force material [kA/m] | | | 11.4 | 3.3 | 51.7 | 51.7 | 11.4 | 11.4 | 11.4 | 11.4 | 11.4 | 51.7 |
|  | Coercive force of micro-magnets [kA/m] | | | 43.6 | 15.6 | 56.7 | 56.7 | 43.8 | 43.9 | 43.9 | 276.3 | 276.3 | 56.3 |
|  | Residual magnetization of micro-magnets [A·$m^2$/kg] | | | 2.7 | 2.0 | 17.0 | 17.0 | 3.1 | 1.4 | 1.4 | 15.1 | 15.1 | 17.4 |
|  | Saturation magnetization of micro-magnets [A·$m^2$/kg] | | | 10.5 | 13.9 | 34.3 | 34.3 | 8.4 | 3.9 | 3.9 | 27.2 | 27.2 | 35.2 |
|  | Thickener mixing ratio [wt %] | | | 1.3 | 1.3 | 1.3 | 4.1 | 1.3 | 1.3 | 0.9 | 1.3 | 4.6 | 1.3 |
|  | Dispersion liquid yield value [N/$m^2$] | | | 0.3 | 0.3 | 0.3 | 4.5 | 0.3 | 0.3 | 0.15 | 0.3 | 7.4 | 0.3 |
| Panel evaluation | Migration characteristics | | | ○ | ○ | ⊗ | ○ | ⊗ | Δ | ○ | ⊗ | ○ | ⊗ |
|  | Reversal characteristics (aggregation characteristics) | | | ○ | ○ | ○ | ○ | ⊗ | ○ | ○ | Δ | ○ | ○ |
|  | Print quality | | | ○ | ○ | ○ | ○ | ○ | ○ | Δ | ○ | Δ | ○ |
|  | Overall evaluation | | | ○ | ○ | ○ | ○ | ⊗ | ○ | ○ | ○ | ○ | ○ |

TABLE 3

| | | | | Example | | | | | | |
|---|---|---|---|---|---|---|---|---|---|---|
| | | | | 21 | 22 | 23 | 24 | 25 | 26 | 27 |
| First layer (magnetic layer) | Mixing ratio (wt %) | High coercive force material | BaO•6Fe$_2$O$_3$ (Hc 145.6 kA/m) | 1.5 | | | | | | |
| | | | BaO•6Fe$_2$O$_3$ (Hc 175.1 kA/m) | | | | 4.4 | | | |
| | | | SrO•6Fe$_2$O$_3$ (Hc 318.3 kA/m) | | 48.5 | 48.5 | | 1.0 | 1.0 | 15.0 |
| | | Low coercive force material | Ni$_x$Zn$_{1-x}$Fe$_2$O$_4$ (0 < x ≦ 1) (Hc 0.8 kA/m) | | | | | | | 15.0 |
| | | | Fe$_3$O$_4$ (Hc 3.3 kA/m) | | | | | | | |
| | | | Fe$_3$O$_4$ (Hc 5.9 kA/m) | 48.5 | | | | | | |
| | | | Fe$_3$O$_4$' (Hc 11.4 kA/m) | | | | | | | |
| | | | Co-γ-Fe$_2$O$_3$' (Hc 51.7 kA/m) | | 1.5 | 1.5 | 6.6 | 1.5 | 1.5 | |
| | | | Co—Fe$_3$O$_4$' (Hc 56.6 kA/m) | | | | | | | |
| | | Binder | Epoxy resin | 50.0 | 50.0 | 50.0 | 65.0 | 97.5 | 97.5 | 70.0 |
| | | Colorant | Blue pigment | 0.0 | 0.0 | 0.0 | 7.2 | 0.0 | 0.0 | 0.0 |
| | | | White pigment | 0.0 | 0.0 | 0.0 | 16.8 | 0.0 | 0.0 | 0.0 |
| | | | Total | 100.0 | 100.0 | 100.0 | 100.0 | 100.0 | 100.0 | 100.0 |
| Magnetic characteristics | | | Coercive force of high coercive force material [kA/m] | 145.6 | 318.3 | 318.3 | 175.1 | 318.3 | 318.3 | 318.3 |
| | | | Coercive force of low coercive force material [kA/m] | 3.3 | 11.4 | 11.4 | 11.4 | 11.4 | 11.4 | 0.8 |
| | | | Coercive force of micro-magnets [kA/m] | 3.6 | 314.3 | 314.3 | 24.5 | 33.8 | 33.8 | 13.5 |
| | | | Residual magnetization of micro-magnets [A·m$^2$/kg] | 1.1 | 8.3 | 8.3 | 1.6 | 0.3 | 0.3 | 1.9 |
| | | | Saturation magnetization of micro-magnets [A·m$^2$/kg] | 20.4 | 14.8 | 14.8 | 10.0 | 0.9 | 0.9 | 13.5 |
| | | | Thickener mixing ratio [wt %] | 1.3 | 1.3 | 2.3 | 1.3 | 1.3 | 0.9 | 1.3 |
| | | | Dispersion liquid yield value [N/m$^2$] | 0.3 | 0.3 | 1.0 | 0.3 | 0.3 | 0.15 | 0.3 |
| Panel evaluation | | | Migration characteristics | ○ | ○ | Δ | ○ | Δ | Δ | ○ |
| | | | Reversal characteristics (aggregation characteristics) | Δ | ○ | ○ | Δ | Δ | Δ | ○ |
| | | | Print quality | Δ | Δ | Δ | ○ | Δ | Δ | Δ |
| | | | Overall evaluation | Δ | Δ | Δ | ○ | Δ | Δ | Δ |

TABLE 4

| | | | | Example | | | | | |
|---|---|---|---|---|---|---|---|---|---|
| | | | | 28 | 29 | 30 | 31 | 32 | 33 |
| First layer (magnetic layer) | Mixing ratio (wt %) | High coercive force material | BaO•6Fe$_2$O$_3$' (Hc 145.6 kA/m) | | 25.0 | 25.0 | | | |
| | | | BaO•6Fe$_2$O$_3$' (Hc 175.1 kA/m) | | 25.0 | | | | |
| | | | SrO•6Fe$_2$O$_3$' (Hc 318.3 kA/m) | | | 25.0 | | | |
| | | Low coercive force material | Ni$_x$Zn$_{1-x}$Fe$_2$O$_4$ (0 < x ≦ 1) (Hc 0.8 kA/m) | | | | | | |
| | | | Fe$_3$O$_4$' (Hc 3.3 kA/m) | | | | | | |
| | | | Fe$_3$O$_4$ (Hc 5.9 kA/m) | | | | 25.0 | | |
| | | | Fe$_3$O$_4$' (Hc 11.4 kA/m) | | | | | 5.0 | 5.0 |
| | | | Co-γ-Fe$_2$O$_3$' (Hc 51.7 kA/m) | 25.0 | | | 25.0 | 45.0 | |
| | | | Co—Fe$_3$O$_4$' (Hc 56.6 kA/m) | 25.0 | | | | | 45.0 |
| | | Binder | Epoxy resin | 50.0 | 50.0 | 50.0 | 50.0 | 50.0 | 50.0 |
| | | Colorant | Blue pigment | 0.0 | 0.0 | 0.0 | 0.0 | 0.0 | 0.0 |
| | | | White pigment | 0.0 | 0.0 | 0.0 | 0.0 | 0.0 | 0.0 |
| | | | Total | 100.0 | 100.0 | 100.0 | 100.0 | 100.0 | 100.0 |
| Magnetic characteristics | | | Coercive force of high coercive force material [kA/m] | — | 145.6/175.1 | 145.6/318.3 | — | — | — |
| | | | Coercive force of low coercive force material [kA/m] | 51.7/56.6 | — | — | 5.9/51.7 | 11.4/51.7 | 11.4/56.7 |
| | | | Coercive force of micro-magnets [kA/m] | 52.8 | 155.5 | 202.2 | 28.5 | 50.3 | 50.9 |
| | | | Residual magnetization of micro-magnets [A·m$^2$/kg] | 8.4 | 8.9 | 15.5 | 9.7 | 15.7 | 16.1 |
| | | | Saturation magnetization of micro-magnets [A·m$^2$/kg] | 18.1 | 14.6 | 26.4 | 35.5 | 35.2 | 37.3 |
| | | | Thickener mixing ratio [wt %] | 1.3 | 1.3 | 1.3 | 1.3 | 1.3 | 1.3 |
| | | | Dispersion liquid yield value [N/m$^2$] | 0.3 | 0.3 | 0.3 | 0.3 | 0.3 | 0.3 |
| Panel evaluation | | | Migration characteristics | ⊗ | Δ | Δ | ○ | ⊗ | ⊗ |
| | | | Reversal characteristics (aggregation characteristics) | Δ | ○ | ○ | Δ | Δ | Δ |
| | | | Print quality | Δ | Δ | Δ | Δ | Δ | Δ |
| | | | Overall evaluation | Δ | Δ | Δ | Δ | Δ | Δ |

TABLE 5

|  |  |  |  | Comparative Example | | | | | | | |
|---|---|---|---|---|---|---|---|---|---|---|---|
|  |  |  |  | 1 | 2 | 3 | 4 | 5 | 6 | 7 | 8 |
| First layer (magnetic layer) | Mixing ratio (wt %) | High coercive force material | $BaO \cdot 6Fe_2O_3$ (Hc 145.6 kA/m) |  |  | 25.0 | 25.0 |  |  |  |  |
|  |  |  | $BaO \cdot 6Fe_2O_3$ (Hc 175.1 kA/m) |  |  |  |  |  |  |  |  |
|  |  |  | $SrO \cdot 6Fe_2O_3$ (Hc 318.3 kA/m) | 25.0 | 25.0 |  |  |  |  |  |  |
|  |  | Low coercive force material | $Ni_xZn_{1-x}Fe_2O_4$ ($0 < x \leq 1$) (Hc 0.8 kA/m) |  |  |  |  |  |  |  |  |
|  |  |  | $Fe_3O_4$ (Hc 3.3 kA/m) |  |  |  |  |  |  |  |  |
|  |  |  | $Fe_3O_4$ (Hc 5.9 kA/m) |  |  |  |  |  |  |  |  |
|  |  |  | $Fe_3O_4$ (Hc 11.4 kA/m) |  |  |  |  |  |  | 50.0 | 50.0 |
|  |  |  | Co-γ-$Fe_2O_3$ (Hc 51.7 kA/m) |  |  |  |  | 50.0 | 50.0 |  |  |
|  |  |  | Co—$Fe_3O_4$ (Hc 56.6 kA/m) |  |  |  |  |  |  |  |  |
|  |  | Binder | Epoxy resin | 75.0 | 75.0 | 75.0 | 75.0 | 50.0 | 50.0 | 50.0 | 50.0 |
|  |  | Colorant | Blue pigment | 0.0 | 0.0 | 0.0 | 0.0 | 0.0 | 0.0 | 0.0 | 0.0 |
|  |  |  | White pigment | 0.0 | 0.0 | 0.0 | 0.0 | 0.0 | 0.0 | 0.0 | 0.0 |
|  |  |  | Total | 100.0 | 100.0 | 100.0 | 100.0 | 100.0 | 100.0 | 100.0 | 100.0 |
| Magnetic characteristics |  | Coercive force of high coercive force material [kA/m] |  | 318.3 | 318.3 | 145.6 | 145.6 | — | — | — | — |
|  |  | Coercive force of low coercive force material [kA/m] |  | — | — | — | — | 51.7 | 51.7 | 11.4 | 11.4 |
|  |  | Coercive force of micro-magnets [kA/m] |  | 318.3 | 318.3 | 145.6 | 145.6 | 51.7 | 51.7 | 11.4 | 11.4 |
|  |  | Residual magnetization of micro-magnets [$A \cdot m^2$/kg] |  | 8.2 | 8.2 | 8.0 | 8.0 | 18.0 | 18.0 | 3.0 | 3.0 |
|  |  | Saturation magnetization of micro-magnets [$A \cdot m^2$/kg] |  | 12.7 | 12.7 | 13.0 | 13.0 | 36.9 | 36.9 | 19.5 | 19.5 |
|  |  | Thickener mixing ratio [wt %] |  | 1.3 | 2.27 | 1.3 | 2.27 | 1.3 | 2.27 | 1.3 | 2.27 |
|  |  | Dispersion liquid yield value [$N/m^2$] |  | 0.3 | 1.0 | 0.3 | 1.0 | 0.3 | 1.0 | 0.3 | 1.0 |
| Panel evaluation |  | Migration characteristics |  | X | X | X | X | ⊗ | ⊗ | ○ | ○ |
|  |  | Reversal characteristics (aggregation characteristics) |  | X | X | X | X | Δ | Δ | X | X |
|  |  | Print quality |  | X | X | X | X | X | X | X | X |
|  |  | Overall evaluation |  | X | X | X | X | X | X | X | X |

Figure 1:
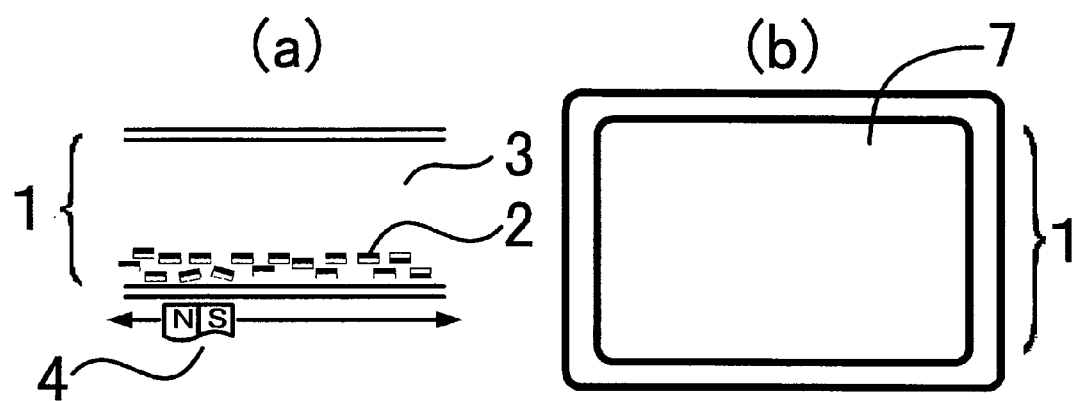
FIG. 1 is a diagram indicating (a) a pattern diagram and (b) a display example when displaying a first color tone.

(Note)
$BaO \cdot 6Fe_2O_3$: Barium ferrite
$SrO \cdot 6Fe_2O_3$: Strontium ferrite
$Ni_xZn_{1-x}Fe_2O_4$ ($0 < x \leq 1$): Nickel zinc ferrite
$Fe_3O_4$: Magnetite
Co-γ-$Fe_2O_3$: Cobalt-deposited maghemite
Co—$Fe_3O_4$: Cobalt-deposited magnetite Preparations for writing were made by attracting micro-magnets (2) to the back surface side using a magnet (4) for erasing from the back surface of the panel (1) as indicated in FIG. 1. At this time, the dispersion liquid components, excluding the micro-magnets, were colored and the micro-magnets (2) were hidden, and therefore a uniform dispersion medium color tone was obtained on a display (7) (first color tone).

Figure 2:
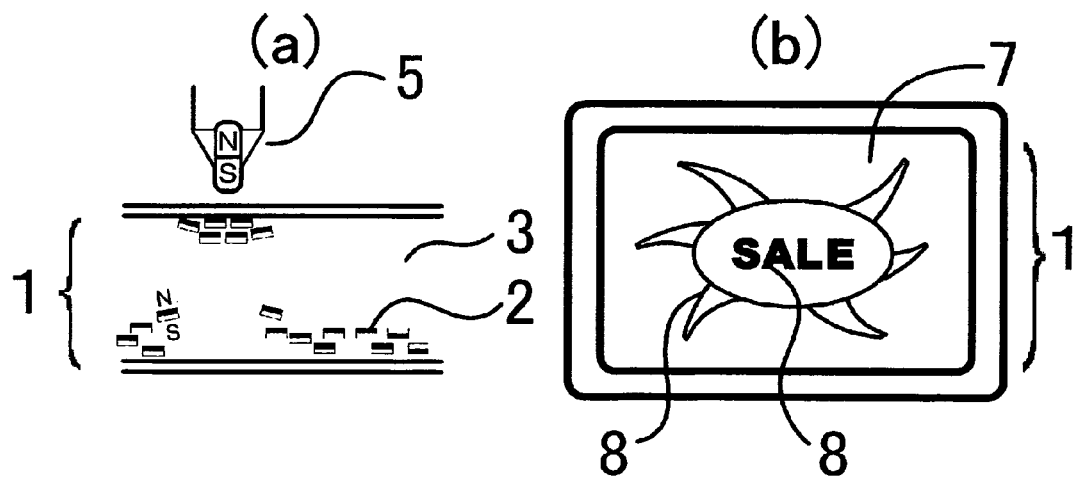
FIG. 2 is a diagram indicating (a) a pattern diagram and (b) a display example when displaying a second color tone.

Next, as indicated in FIG. 2, the S pole of a comparatively strong magnet (5) for writing was moved from the panel (1) front surface across the display surface on the part where writing was desired. While the micro-magnets (2) migrated from the back surface side to the display surface side (some of them were reversed), the N pole surface of the micro-magnets (2) lined up on the display surface side of the panel, and writing (8) with the color tone of the N pole surface was obtained (second color tone).

Figure 3:
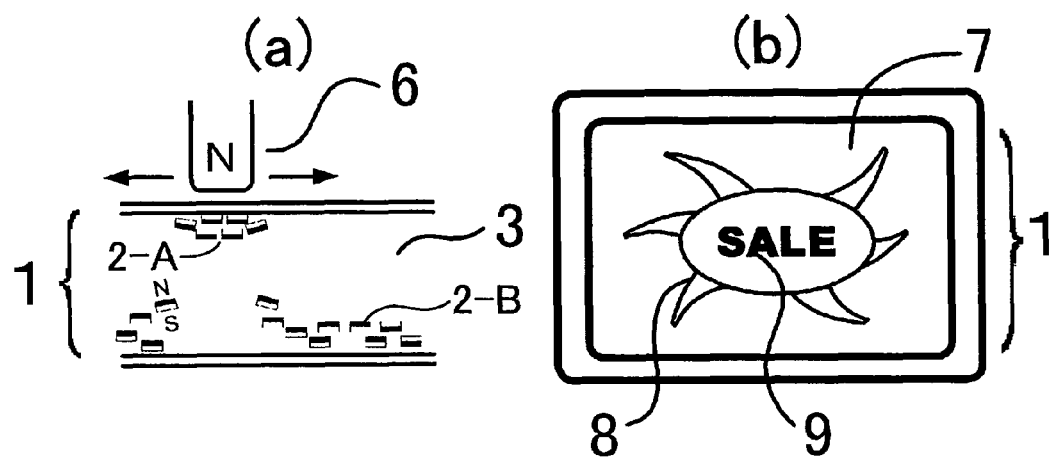
FIG. 3 is a diagram indicating (a) a pattern diagram and (b) a display example when displaying a third color tone.

Further, as indicated in FIG. 3, when sweeping this surface with the N pole of the other magnet (6) for reversal having a weak magnetic force, only the micro-magnets (2-A) that had migrated to the display surface side were reversed without attracting the micro-magnets (2-B) that had not migrated to the display surface side, the writing (9) based on the S pole surface configured by the related micro-magnets (2-A) that had migrated then appeared, and the display color could be changed while maintaining the display shape unchanged (third color tone).

Finally, the comparatively strong magnet (4) for erasing was scanned from the back surface side, and the display was erased by making the micro-magnets (2) migrate to the back surface side (first color tone).

The evaluations of the magnetic migration and reversal display panels indicated in the examples and comparative examples are shown in Tables 1 to 5.

<Panel Evaluation Method>

Evaluation test items were: 1. Migration characteristics, 2. Reversal characteristics (aggregation characteristics), 3. Print quality, and 4 Overall evaluation.

First, after fully attracting the micro-magnets to the back surface side using the magnet for erasing (surface magnetic flux density 65 mT) from the back surface of the magnetic migration and reversal display panel, a display was made on the display surface using a magnetic pen, and that display was visually evaluated.

The magnetic pen for writing was suitably selected from four kinds of pens having a surface magnetic flux density of 65, 200, 270, or 400 mT depending on the coercive forces of the magnetic materials in the micro-magnets, giving as much priority to the writing characteristics as possible without breaking down the magnetic poles of the micro-magnets, and used.

Migration Characteristics

⊗: All of the micro-magnets migrate to the front surface side, and none remain on the back surface side.

◯: The micro-magnets migrate to the front surface side, but a few remain on the back surface side.

Δ: The micro-magnets have difficulty migrating to the front surface side, and some remain on the back surface side.

X: The micro-magnets do not migrate to the front surface side, or that only a very few micro-magnets migrate.

Reversal characteristics (aggregation characteristics)

ⓧ: The micro-magnets do not aggregate, and all are reversed with satisfactory alignment characteristics.

◯: Slight aggregation of micro-magnets is observed, but the micro-magnets are reversed.

Δ: Although aggregation of micro-magnets is observed, nearly all the micro-magnets are reversed.

X: The micro-magnets do not reverse, or only a very few micro-magnets are reversed.

Print Quality

ⓧ: The display is clear with satisfactory contrast, and the print quality is good.

◯: The display is made with satisfactory contrast.

Δ: Sedimentation of micro-magnets or poor migration characteristics are observed, and although a display can be made, it is' partially unclear.

X: The contrast is poor and the display unclear, or no display can be made.

Overall Evaluation

ⓧ: Extremely satisfactory and practical panel

◯: Satisfactory and practical panel

Δ: Some problems, but a practical panel

X: Poor performance and impractical

The evaluations of the Examples are indicated in the tables, and are explained in detail below.

Although there were performance differences among Examples 1 to 33, they were satisfactory overall.

In particular, Examples 1 to 5, 9 to 10 and 15 were balanced in all the evaluation items and were extremely satisfactory. As demonstrated by Examples 5 and 10: it was difficult to bring out a performance difference even when changing the yield value; the degrees of freedom in the design of the physical properties of the dispersion liquid increased; there was little deterioration of performance caused by such conditions as changes over time and ambient temperature; and the range of selection of external magnets, etc. was broadened.

Although revealing a slight tendency to aggregate, Examples 8, 13, 18 and 20 were satisfactory overall.

In case of Examples 6, 11, 12, 24 and 27, although the residual magnetization was slightly low, and therefore a tendency to produce non-reversed micro-magnets was revealed, they showed satisfactory results on the whole.

Although the residual magnetization was even lower, and therefore a somewhat greater tendency to produce non-reversed micro-magnets was revealed than in Example 6, Example 7 showed satisfactory results on the whole.

A tendency toward aggregation was revealed in Example 13, and therefore Example 14 was made a more preferable form by controlling the yield value.

Although the saturation magnetization in Example 16 was low and posed slight difficulties for the migration characteristics, Example 16 showed satisfactory results on the whole, and when lowering the yield value as in Example 17, even better control was possible. Moreover, although the residual magnetization in Example 16 was slightly low, and therefore a tendency to produce non-reversed micro-magnets was revealed, this example showed satisfactory results on the whole.

A slight tendency toward aggregation was revealed in Example 19, and although the aggregation could be controlled by raising the yield value, such restrictions were engendered as: the yield value had to be set high, a dependence on the changes over time and the ambient temperature developed; and the external magnet had to be strengthened.

Example 21 had satisfactory migration performance but difficulties with reversal performance, and was at the borderline usability level.

Example 22 revealed a slight tendency to aggregation, but was at the borderline usability level because the micro-magnets could migrate. Moreover, although the yield value was raised in Example 23 because of the slight tendency to aggregation, the residual magnetization and saturation magnetization values were lowered, and the migration characteristics were affected. Therefore, Example 22 was found to be at a borderline level which could be controlled by the yield value.

Because both the residual magnetization and the saturation magnetization of Example 25 were low, migration of the micro-magnets was difficult and a tendency toward the generation of non-reversed micro-magnets was revealed. In Example 26, although the yield value was controlled as an attempt, Example 26 was likewise at the borderline usability level.

The display panels of Examples 28 and 31 to 33 had good migration characteristics but slightly poor reversal characteristics, and there were many restrictions such as the need to select comparatively weak external magnets so that the magnetic poles of the micro-magnets would not break down. Selection of external magnets could ultimately affect the migration and reversal performance. Moreover, Examples 29 and 30 had problems with migration characteristics, and because there was a tendency to generate aggregation, there were many restrictions on the adjustment of the suitable external magnet and the dispersion liquid properties. Examples 28 to 33 were given overall evaluations of Δ, and were somewhat inferior to the results of the other examples.

The micro-magnets of Comparative Examples 1 to 8 all used magnetic materials of a single group, had limitations in control of the magnetic characteristics of the micro-magnets, and could not obtain satisfactory performance.

The micro-magnets of Comparative Examples 1 and 2 had great difficulty migrating, and migrated only when a strong magnet was used, but then the micro-magnets aggregated, and there was little contrast. Comparative Examples 3 and 4 showed slightly better results than Comparative Examples 1 and 2, but still showed poor migration characteristics, and the magnetic poles of the micro-magnets broke down when a strong magnet was used.

Comparative examples 5 and 6 showed good migration characteristics, but they showed inferior reversal characteristics. Further, the magnetic poles of the micro-magnets broke down as in the above examples when a little stronger magnet was used. In Comparative Examples 7 and 8, it could not be said that the micro-magnets would reverse at all, and because it was also difficult to produce reversal to give momentum for migration, there was also an influence on migration characteristics and the magnetic poles of the micro-magnets broke down even when not using a strong magnet for the external magnet.

Comparative Examples 2, 4, 6, and 8 were carried out by controlling the yield values in Comparative Examples 1, 3, 5, and 7 respectively, but a usable level could not be achieved.

INDUSTRIAL APPLICABILITY

The aforementioned magnetic migration and reversal display panel and magnetic migration and reversal display method using the same is a breakthrough that allows two colors, which are the color tones of the front and back of micro-magnets, to be displayed on a background color, and in combination with the color tone of the dispersion liquid components, such as the dispersion medium excluding the micro-magnets, three colors can appear. Moreover, the magnetic display offers the superior effect of being able to vary the color by optionally selecting an optional part of the writing. Specifically, there are the superior effects that cannot be achieved by a blackboard or white board, in which the color of the important points of characters already written can be changed and displayed, the color can be easy changed of only places where highlighting is desired such as advertising displays, and if this becomes unnecessary, the original state can be easily restored. A better effect is offered by using this panel instead of blackboards or white boards at schools, etc.

The invention claimed is:

1. A magnetic migration and reversal display panel comprising at least a dispersion liquid having a yield value obtained by dispersing, in a dispersion medium comprising a colorant, micro-magnets having magnetic poles that differ in color and that differ in color from the dispersion medium as well, and support members that retain the dispersion liquid, wherein each of the micro-magnets comprises two or more kinds of magnetic materials with different coercive forces including a first magnetic material consisting of a high coercive force material having a coercive force of from 65.0 kA/m to 600 kA/m, and a second magnetic material consisting of a low magnetic coercive force material having a coercive force of from 0.8 kA/m to less than 65.0 kA/m.

2. The magnetic migration and reversal display panel according to claim 1, wherein the coercive force of the first magnetic material is two or more times the coercive force of the second magnetic material.

3. The magnetic migration and reversal display panel according to claim 1, wherein the first magnetic material is hexagonal magnetoplumbite-type ferrite, and the second magnetic material is at least one magnetic material selected from the group consisting of magnetite, maghemite, cobalt-deposited magnetite, and cobalt-deposited maghemite.

4. The magnetic migration and reversal display panel according to claim 1, wherein the coercive force of the micro-magnets is from 4.0 kA/m to 600 kA/m.

5. The magnetic migration and reversal display panel according to claim 1, wherein the residual magnetization per unit mass of the micro-magnets is 1 to 35 $A \cdot m^2/kg$, and the saturation magnetization per unit mass of the micro-magnets is 1 to 100 $A \cdot m^2/kg$.

6. The magnetic migration and reversal display panel according to claim 1, wherein the yield value of the dispersion liquid is 0.15 to 7.5 $N/m^2$.

7. The magnetic migration and reversal display panel according to claim 1, wherein a colorant contained in the dispersion liquid has a desired color tone.

8. The magnetic migration and reversal display panel according to claim 1, wherein a fluorescent coloring agent is contained in at least one of the dispersion medium and micro-magnets.

9. The magnetic migration and reversal display panel according to claim 1, wherein an antistatic agent is contained in the dispersion liquid.

10. A magnetic migration and reversal display method, wherein the magnetic migration and reversal display panel according to claim 1 is used, the method comprising:

forming writing by causing an external magnet for writing to act on the micro-magnets for causing migration or migration and reversal of the micro-magnets, and thereby causing the color tone of the specified surface of the micro-magnets to be displayed; and then changing the color tone of the writing by reversing the micro-magnets forming the writing by causing a magnetic field of the magnetic pole opposite to the magnetic pole of the external magnet for writing to act from the same surface side within a range that other micro-magnets that do not form the writing are not caused to migrate.

* * * * *